(12) United States Patent
Reisch et al.

(10) Patent No.: US 8,028,596 B2
(45) Date of Patent: Oct. 4, 2011

(54) TRANSMISSION DEVICE HAVING AT LEAST ONE SHIFT ELEMENT WHICH CAN BE ACTUATED BY MEANS OF AN ACTUATOR ARRANGEMENT WHICH HAS AT LEAST ONE ELECTRICAL COMPONENT

(75) Inventors: Matthias Reisch, Ravensburg (DE); Mark Mohr, Tettnang (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 368 days.

(21) Appl. No.: 12/444,640

(22) PCT Filed: Oct. 2, 2007

(86) PCT No.: PCT/EP2007/060457
§ 371 (c)(1),
(2), (4) Date: Apr. 7, 2009

(87) PCT Pub. No.: WO2008/046737
PCT Pub. Date: Apr. 24, 2008

(65) Prior Publication Data
US 2010/0071497 A1 Mar. 25, 2010

(30) Foreign Application Priority Data
Oct. 19, 2006 (DE) .......................... 10 2006 049 275

(51) Int. Cl.
*F16H 59/14* (2006.01)
(52) U.S. Cl. ........................................ 74/335
(58) Field of Classification Search ...................... 74/335
See application file for complete search history.

(56) References Cited

U.S. PATENT DOCUMENTS

| | | | |
|---|---|---|---|
| 2,969,134 A | 1/1961 | Wiedmann et al. | |
| 2,992,565 A * | 7/1961 | Hansen et al. | 74/346 |
| 6,401,558 B1 * | 6/2002 | Caramagno | 74/325 |
| 2008/0184844 A1 * | 8/2008 | Mizuno et al. | 74/664 |

FOREIGN PATENT DOCUMENTS

| | | |
|---|---|---|
| DE | 1120896 | 12/1961 |
| DE | 4325964 | 7/1993 |
| DE | 19921064 | 11/2000 |
| DE | 10006226 | 8/2001 |
| DE | 10209539 | 9/2002 |
| DE | 10206584 | 9/2003 |
| DE | 10302502 | 9/2004 |
| DE | 102004028595 | 12/2005 |
| EP | 1357317 | 10/2003 |
| FR | 1255454 | 3/1961 |
| JP | 03-260438 | 11/1991 |
| WO | 0180444 | 10/2001 |
| WO | 03081615 | 10/2003 |
| WO | 2007025845 | 3/2007 |

* cited by examiner

*Primary Examiner* — Edwin A Young
(74) *Attorney, Agent, or Firm* — Davis & Bujold, P.L.L.C.

(57) ABSTRACT

A transmission device (1) having a switching element, which is actuated by at least one electric component (5, 17) which is part of an actuator (4). The electric actuator component is linked to a countershaft (3) of the transmission and rotates at the speed of countershaft (3) during operation, and is functionally connected through an electric transformer rotary transformer device (15) with further enclosure mounted components of the transmission device (1). Via the transformer device (15), electric energy and/or data can be exchanged, through collector ring contacts, using inductive or capacitive coupling between the enclosure mounted components of transmission device (1) and at least one electric actuator component (5, 17) which is linked with the countershaft (3).

14 Claims, 1 Drawing Sheet

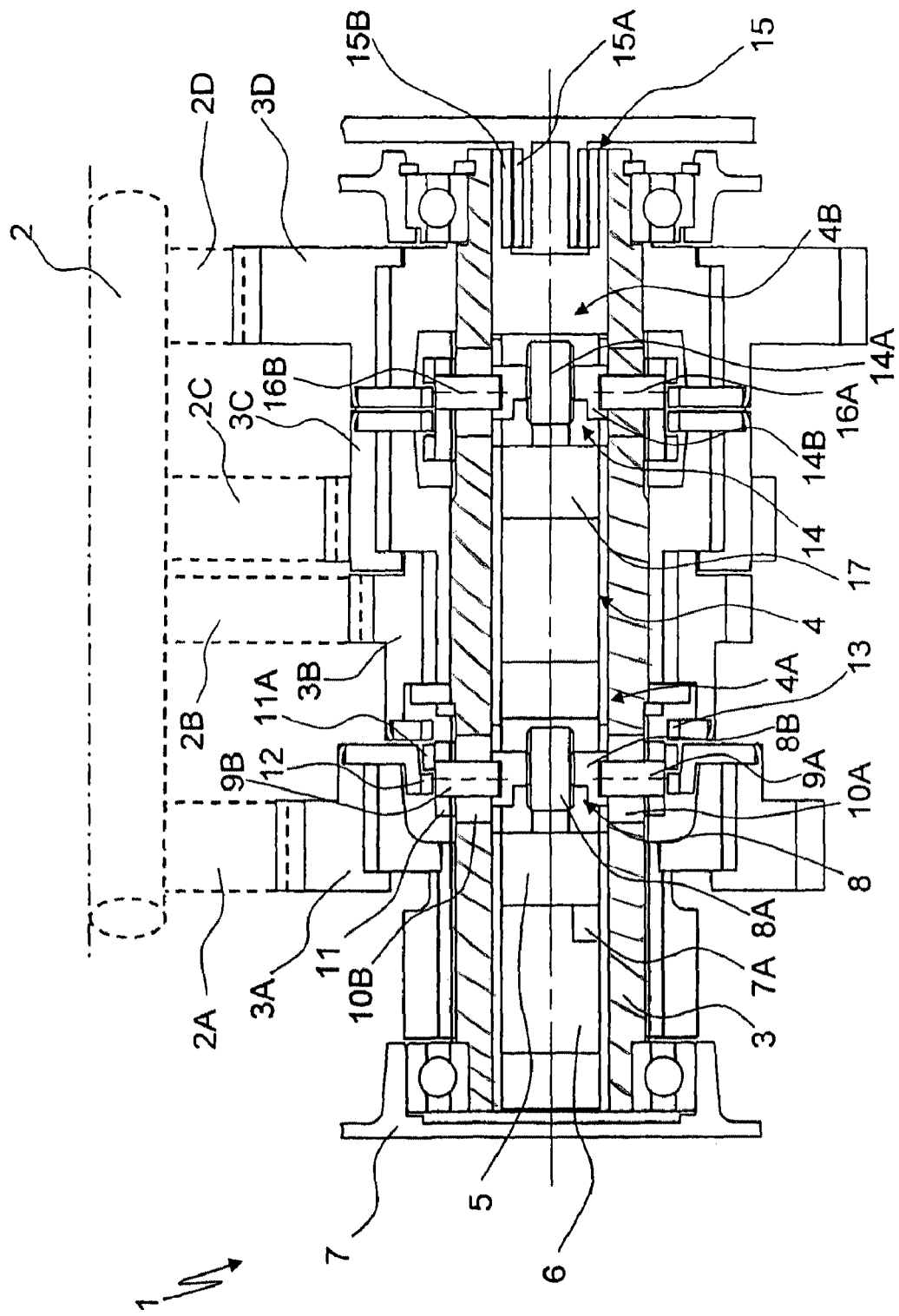

TRANSMISSION DEVICE HAVING AT LEAST ONE SHIFT ELEMENT WHICH CAN BE ACTUATED BY MEANS OF AN ACTUATOR ARRANGEMENT WHICH HAS AT LEAST ONE ELECTRICAL COMPONENT

National Stage filing of PCT/EP2007/060457 filed Oct. 2, 2007 which claims priority form German Application No. 10 2006 049 275.7 filed Oct. 19, 2006.

FIELD OF THE INVENTION

The invention describes a transmission device incorporating a shifting element being operated and initiated through an actuator configuration with at least one electrical element.

BACKGROUND OF THE INVENTION

Known in the art is an intermediate gear transmission such as a double clutch transmission, automatic shift transmissions, manual shift transmissions, or the like. These are generally configured and built by mounting rotating gear wheels on a shaft which are interconnecting with fixed gear wheels on an additional shaft, forming the so called gear wheel pairing. Through the interchangeable, fixed connections with the wheels which rotate on the shaft, the pairing of different gear shift positions in the intermediate transmission and its related flow of force in the intermediate transmission can be achieved by adding switching elements such synchronization devices or claw or friction elements.

The activation of the switching elements, needed to shift the required gear pair configurations, takes place on the related shaft where the gear wheels, such as idle gears, are loosely positioned in the intermediate gear transmission, either mechanically, hydraulically, pneumatically, or magnetically, from either the outside or the inside.

The documents of DE 102 06 584 A1, DE 43 25 964 A1, and DE 103 02 502 A1 present the general state of the art, in view of operating the switching elements, in regard to operating the switching elements, from the inner section of the shaft to enable or disable the idle gear wheels or gear wheel pairing, respectively.

The external activation of the switching elements, in an intermediate transmission, is usually achieved via a shift fork or a similar device, whereby the activation of the switching elements from the inner part of the shaft, which carries the idle gear wheels, require less space when compared to activation of idle gear wheels and required shaft surface from the outside, because the switching configuration is located in the inside of the shaft, requiring also less space in the radial direction. To the contrary, intermediate transmissions with an inner activation mechanism of the idle gear wheels require more space in comparison to intermediate transmissions with an external activation of the switching elements in the axial direction.

This is based on the application of an activation force and directing it to the switching elements located in between the idle gear wheels, in order to activate the idle gear wheels and switching elements in the inner part of the shaft which also carries the idle gear wheels. Since neither the width of the bearings of the idle gear wheels located on the shaft nor the switching elements space requirements can be altered, and the directional guidance of the activating force through the shaft is very limited, the internal activation of the switching elements of the shaft has to be achieved in areas which are not functionally utilized by the idle gear wheels or the switching elements. As a result, available unused areas of the shaft are needed which can only be made available by extending the length of the shaft.

SUMMARY OF THE INVENTION

This inventive task and purpose is the design and presentation of a transmission which requires lesser space when compared to conventional transmissions.

In a first aspect of the invention transmission device, which comprises at least one available switching element that is activated by way of an actuator configuration comprising at least one electrical element. The electrical element is connected to the transmission shaft and rotates simultaneously at the same speed as the transmission shaft and, for example, works through an electrical transformer device with additional elements of the transmission which are physically attached to the transmission housing, whereby electric energy and/or data can be exchanged through collector ring contacts between the housing-mounted transmission system's elements and with at least one of the electrical elements connected to the transmission's shaft.

Alternatively to the previously described invention of the transmission, the electric energy and/or data are exchanged by means of induction or capacitive applications.

The very first embodiment of the invention and the following alternatives of this inventive transmission device allow, in a simple state of the art, the possibility of combining an electric component, needed to operate a switching element actuator, with the transmission shaft resulting in a very compact and also space saving configuration of all the different elements in the transmission system.

According to the invention, the transfer of electric energy and/or data between elements and components, which are mounted to the transmission housing, and electric elements needed for operation of at least one of the switching elements of the designated actuator offers, in a simple way, the opportunity to make use of readily available space, in the area of the gear shaft within of the existing transmission system, by placing one electric component needed to activate the switching element, also avoiding additional costly steps in the construction of the transmission to accommodate at least one switching element.

Additional advantages and favorable embodiments of this invention are further result from the claims, referencing the drawing and the shown principal example of the configuration.

BRIEF DESCRIPTION OF THE DRAWINGS

The sole FIGURE of the drawing shows a highly schematic longitudinal cross sectional view of a transmission device according to the invention.

DETAILED DESCRIPTION OF THE INVENTION

The shown FIGURE is a part of a transmission system 1, shown as an intermediate transmission configuration and shown in a longitudinal sectional view, presenting a transmission main shaft 2 and parallel to herewith a structure of the countershaft 3. Several gear wheels 2A to 2D are mounted on the transmission main shaft 2 and arranged as fixed gear wheels which interconnect with several rotatable idle gear wheels 3A to 3D supported on the countershaft 3. Idle gear wheels 3A and 3B can be engaged by way of a first switching device 4A of the actuator 4, while the idle gear wheels 3C and 3D can be engaged via a second switching device 4B of the actuator 4 so to become connected with countershaft 3 in a rotationally fixed manner.

The switching devices 4A and 4B basically have the same construction and configuration which is why the following specification focuses mainly on the switching device 4A only.

The switching device 4A is equipped with an electric actuator 5, which is designed here as an electrical device and possesses an allocated electrical control and power unit 6 that is connected with the countershaft 3 in a rotationally fixed manner. Both the electrical device 5, representing the electric actuator, and the control and power unit 6 are, in this case, connected with the countershaft in a rotationally fixed manner 3 and hence, during the operation of the transmission system 1, rotate at the rotational speed of countershaft 3. An output shaft of the electric actuator 5, not presented here in greater detail, is coupled in a rotationally fixed manner with a spindle 8A and with the spindle-nut configuration 8 of the switching device 4A so that drive of an electric device of the spindle 8A would trigger its rotation and that the spindle 8A and its meshed nut 8B, which is connected in a rotationally fixed manner with the countershaft 3, are moved by countershaft 3 in an axial direction either towards or away from actuator 5.

The nut 8B, in this case, is physically combined with bolts 9A and 9B, in a way that the bolts 9A and 9B can be shifted in an axial direction with reference to countershaft 3 by the nut 8B within slotted holes 10A, 10B of the countershaft 3. Bolts 9A and 9B, as well as the nut 8B in the spindle-nut configuration 8, rotate, during the operation of the transmission system 1, around the rotational axis of the countershaft 3 and at the rotational speed of countershaft 3.

To connect the idle gear wheel 3A and idle gear wheel 3B with countershaft 3 in a rotationally fixed manner, thus changing the status from a disengaged condition to an engaged condition, bolt 9A and bolt 9B are, viewed from an opposite end of the nut 8B, linked with a sleeve element 11, which is mounted in a tight fit connection with the countershaft 3, surrounding the countershaft and which can be shifted in an axial direction of the countershaft 3. In addition, the sleeve element 11 is equipped with a gear tooth profile 11A, on its outer perimeter with reference to countershaft 3, which, depending on an axial position with a gear tooth profile 12 of the idle gear wheel 3A, or with a fixed gear tooth profile 13 of the idle gear wheel 3B a connection or, in an intermediate position of these two gear tooth profiles 12 and 13, not being interconnected at all and neither the idle gear wheel 3A nor the idle gear wheel 3B are coupled with the countershaft 3 in a rotationally fixed manner. The spindle-nut configuration 8 and the spindle-nut configuration 14 of the switching device represent, in each case, a drive transformation device whereby the rotational drive of the electric actuator 5, the switching device 4B and actuator's 4 electric part of actuator 17, is being transformed into an axial drive motion to or deactivating the idle gear wheels 3A to 3D.

The spindle-nut configurations 8 and 14 comprise a self-locking design, to avoid a self-acting engagement or disengagement of one of the idle gear wheels 3A to 3D, so that the nut 8B of the spindle-nut configuration 8 and the nut 14B of the spindle-nut configuration 14 permanently keep their position if there is no electric driving force is present.

Additional configurations of the transmission system, not necessarily further noted in the drawing, provide a defined retention of the latch position of the switching device, especially through the sleeve element 11, in this case by means of the electric actuator and adequate drive control of the switching device through electric latching pulse.

In addition or as an alternative in this invention, an electro mechanically operated brake can be assigned and added to the electric part of the actuator responsible for the holding of the switching state of the idle gearwheel assigned switching element, which prevents a change in the state of the switching element or the position of the idle gear wheel when a current is not applied. Hereby, the brake, when designed as an electric part, is connected and combined with the actuator and its drive shaft, so that a rotation of the spindle and the spindle-nut configuration, linked to the output shaft of the motor, can be avoided when no power is being applied to the actuator.

The interior of the countershaft 3 comprises, in addition to the actuator 5 and the allocated control and power electronics 6, an energy storage device 7 to store electric energy, in this case a capacitor, through which the voltage being delivered to the actuator 5 will be filtered and smoothed out. In addition or as an alternative, the energy storage device 7, preferred as a capacitor, can also be used as a buffer storage device to deliver energy for the operation of the electric actuator 5.

Moreover, the energy storage device 7, the control and power electronic 6 as well as electric actuator 5, constructed as a modular device, is equipped with oil ducts which can carry hydraulic fluid, inside of countershaft 3, for lubrication, cooling, and operating the different elements in the transmission 1.

In the inventive continuation of the transmission system 1 as presented in this FIGURE, the actuator 4 which engages the idle gear wheels 3A to 3D in the area between actuator 5 and the spindle-nut configuration 8, as well as between actuator 17 and the spindle-nut configuration 14, here not presented in detail, are configured as part of the transmission system so that the drive power for the actuator 5 can be adequately transformed to activate spindle 8A, also the spindle 14A of the spindle-nut configuration 14, and therefore generate the required torque to shift nut 8B and nut 14B, respectively, in an axial direction.

An energy transfer and a control signal transfer, or data transmission, between externally applied and enclosure mounted components of the countershaft 3 of the transmission system 1 and the rotationally fixed electric actuators 5 and 17 of the countershaft is achieved, in this case, through an inductive coupling with a rotary transformer 15. This implies that an exchange takes place, through the inductive transformer device 15, to transfer the necessary energy for operating the actuators 5 and 17 but also, in a bidirectional manner and on a non-contact basis, to transfer the necessary control signals, i.e., nominal value and actual value. As an alternative to the inductive transfer of the energy and the control signals, the transfer can also take place through collector rings or through capacitive coupling, i.e., through an electric field, residing between the rotating elements of the actuators within the transmission shaft and the housing mounted components and elements.

The rotary transformer device 15 is arranged coaxially with the transmission shaft or the countershaft 3 whereby a housing mounted coil configuration 15A of the transformer device 15 is located inside of the countershaft 3. This arrangement offers the advantage of constructing a transmission system of shorter length if an additional, unused end of the shaft can be made available.

As an alternative to the previous version, the housing mounted coil configuration, not explained here in further detail, can also be provided externally to the transmission shaft, if there is an unused end portion of the shaft which is available, whereby such configuration and construction of a transmission system would require a larger, upper space in the axial direction of the transmission system.

The rotary transmission device 15 generates the required electrical energy for the actuator 5 and the actuator 17 and the required data to control the actuator 5 and actuator 17 within different frequency ranges, whereby the transfer of energy occurs within the frequency range of 20 kHz to 200 kHz and the data is transferred within the range of 100 MHz or in the Gigahertz range, which is being exchanged in a bidirectional format between actuator 5 and actuator 17 and the housing mounted elements and components of the transmission configuration 1, for instance within a transmission control device.

The rotary transmission device 15 represents a kind of transformation unit where an additional housing mounted coil configuration 15A interacts with the coil configuration 15B, rotating together with the countershaft and which, in itself, is connected with an electronic module rectifier. Through the rectifier, an alternating voltage will be rectified and also filtered by a following filter configuration, whereby the filter stage is linked to a component which reads the transmitted signals and modulates them to impose high frequencies to the secondary voltage signal and to transfer the actual value of the electric actuator 4 to the transmission control unit. Therefore, several different operating conditions of the actuator 5 and actuator 17, i.e., the stop position or the rotational position of actuator 5 and 17, can be transferred to the housing mounted elements of the transmission unit to identify, in the electric transmission control unit, if a gear wheels 3A to 3D is engaged or not.

For that reason, the transmission system housing mounted elements and components, in view of connected components and the actuators 5 and 17, respectively, of the countershaft 3 and the data which has to be transferred, represent a nominal value for operation of the idle gear wheels 3A to 3D and of the switching element assigned to the idle gear wheels 3A to 3D.

The electric components of actuator 4, linked to the countershaft 3, and the actuator 5 and the actuator 17, part of the transmission system 1 and which receives the data, herewith provide feedback with regard to the actual operating condition of the actuator 4 and also represent the actual values of the actuator 4.

Deviating from the previously specified and alternative data transfer mode between the countershaft fixed mounted components of the actuator unit 4 and the fixed mounted components of the transmission system 1, the data can also be transmitted through the transmission device by means of an optical and/or a wireless transmission, while the energy is being transferred through an inductive or a capacitive coupling, or through collector ring contacts.

The coil configuration 15B of the rotary transmission device 15, linked with countershaft 3, represents together with the electric actuator 5 and electric actuator 17 of the actuator unit 4 and linked with the countershaft, a common module whereby the assembly of the invented transmission system 1 has been simplified, as compared to the current state of the art.

A further simplification during the assembly of the invented transmission system can be accomplished if the housing mounted part of the rotary transmission device, in this case the coil configuration 15A and not presented here in detail, is configured as a part of the transmission system control unit, resulting in a common and consolidated module which includes necessary connectors of the transmission.

Because the switching device 4A and also the switching device 4B are part of the module which is being inserted, as a whole, into the interior of countershaft 3 during the assembly of the transmission system 1, rotation of the module by 90° is needed, referenced to the axial end position, during the assembly to create a connection between the spindle nuts 8B and 14B, and the bolts 9A, 9B, as well as bolts 16A and 16B of the switching device 4B. Hereafter, the module will become rotationally fixed by means of clip fasteners, by connecting screws, a splint connection, a fastening glue, or a caulk connection.

Additionally, the rotary transmission device 15 can be configured as a fluid driven configuration where hydraulic system fluid of the transmission system 1 is injected into the countershaft 3, and the fluid is used as a lubricant for cooling, and/or for activation of the different elements of transmission system 1.

In an additional version of the invented transmission system, the transmission configuration is equipped with just one actuator or electric actuator, respectively, to generate the moving force for engagement or disengagement of an element or a gear wheel, in this case the actuator has an assigned selection actuator present. Through the selection actuator, a selection can be performed between the elements to be activated or the idle gear wheels of the transmission system so that the choice of a gear wheel or element of the selection actuator, or the assigned switching element, can be exposed to the activation energy of the actuator.

Hereby, the selection actuator comprises a switching magnet which, between the electric actuator of the configuration and the component or gear wheel to be activated on top of the configuration, establishes the link for activation of the component or the gear wheel which is assigned to the switching device.

DRAWING REFERENCES

1 Transmission Device
2 Transmission Main Shaft
2A to 2D Gear Wheels
3 Transmission shaft
3A to 3D Idle Gear Wheels
4 Actuator
4A,B Switching Device
5 Electric Actuator
6 Control & Power Electronics
7 Housing
7A Energy Storage Device
8 Spindle-Nut Configuration
8A Spindle
8B Nut
9A,B Bolt
10A,B Slotted Hole
11 Sleeve Element
12 Gear Tooth Profile
13 Gear Tooth Profile
14 Spindle-Nut Configuration
14A Spindle
14B Nut
15 Rotary Transformer
15A, 15B Coil Configuration
16A, 16B Bolt
17 Actuator

The invention claimed is:

1. A transmission device having at least one shift element which is actuated by an actuator device having at least one electrical component, the at least one electrical component being coupled to a countershaft of the transmission and rotating, during operation, at a rotational speed of the countershaft, the at least one electrical component being functionally connected, via a rotary transformer of an electric transformer device, with additional elements of the transmission device that are mounted on a transmission housing for transmitting at least one of electric energy and data between the at least one electrical component and the additional elements of the transmission device.

2. The transmission device according to claim 1, wherein the rotary transformer (15) is coaxial with the countershaft (3).

3. The transmission device according to claim 1, wherein the at least one electrical actuator component (5, 17) receives electrical energy, via the rotary transformer (15), and receives and transmits electrical data, via the rotary transformer (15).

4. The transmission device according to claim 1, wherein the electrical data received by the at least one electrical actuator component (5, 17) controls operation of the actuator (4).

5. The transmission device according to claim 1, wherein the at least one electrical actuator component (5, 17) transmits data relating to operation of the actuator (4).

6. The transmission device according to claim 1, wherein the at least one electrical actuator component (5, 17) transmits data via at least one of an optical means and radio waves.

7. The transmission device according to claim 1, wherein the rotary transformer (15) is a fluid feed line.

8. The transmission device according to claim 1, wherein the electric actuator component (5, 17) is an electrical device which is functionally connected between an output shaft of an engine and a sleeve shifting element (11), which communicates with a spindle nut configuration (8, 14), for converting rotational drive of the electric actuator component (5, 17) into a translational drive to bias the sleeve shifting element (11) in a desired direction.

9. A transmission device (1) having at least one sleeve shifting element (11) being actuated by an actuator device (4) having at least one electric actuator component (5, 17), the at least one electric actuator component (5, 17) being rotationally fixed to a countershaft (3) of the transmission and being functionally connected, via a rotary transformer (15), with additional components of the transmission device (1) that are rigidly secured to a transmission housing, the rotary transformer (15) transmitting at least one of electrical energy and electrical data, by one of an inductive or a capacitive coupling, between the additional components of the transmission device (1) and the at least one of the electric component (5, 17).

10. The transmission device according to claim 9, wherein a first coil element (15A) of the rotary transformer (15) is fixed within the countershaft (3).

11. The transmission device according to claim 10, wherein a second coil element (15B) of the rotary transformer (15) is rigidly secured outside of the countershaft (3).

12. The transmission device according to claim 11, wherein the second coil element (15B) of the rotary transformer (15) and at least one of a transmission control device and at least one connector of the transmission are combined with one another in a common module.

13. The transmission device according to claim 10, wherein the first coil element (15A) of the rotary transformer (15) and the electric actuator component (5, 17) are combined with one another in a common module.

14. The transmission device according to claim 9, wherein the rotary transformer (15) transmits electrical energy and electrical data within a range of frequencies.

* * * * *